(12) United States Patent
Hwang et al.

(10) Patent No.: US 9,716,277 B2
(45) Date of Patent: Jul. 25, 2017

(54) HIGH PERMEABLE POROUS SUBSTRATE FOR A SOLID OXIDE FUEL CELL AND THE PRODUCTION METHOD THEREOF

(71) Applicant: Institute of Nuclear Energy Research Atomic Energy Council, Executive Yuan, Taoyuan (TW)

(72) Inventors: Chang-Sing Hwang, Taoyuan (TW); Chun-Huang Tsai, Taoyuan (TW); Chun-Liang Chang, Taoyuan (TW); Zong-Yang Chuang Shie, Taoyuan (TW); Sheng-Fu Yang, Taoyuan (TW); Te-Jung Huang, Taoyuan (TW); Shih-Wei Cheng, Taoyuan (TW)

(73) Assignee: INSTITUTE OF NUCLEAR ENERGY RESEARCH ATOMIC ENERGY COUNCIL, EXECUTIVE YUAN, Taoyuan (TW)

( * ) Notice: Subject to any disclaimer, the term of this patent is extended or adjusted under 35 U.S.C. 154(b) by 177 days.

(21) Appl. No.: 14/681,532

(22) Filed: Apr. 8, 2015

(65) Prior Publication Data

US 2016/0126559 A1      May 5, 2016

(30) Foreign Application Priority Data

Oct. 30, 2014      (TW) .............................. 103137641 A

(51) Int. Cl.
*H01M 4/86* (2006.01)
*H01M 4/88* (2006.01)
*H01M 8/12* (2016.01)
*H01M 4/90* (2006.01)
*H01M 8/124* (2016.01)

(52) U.S. Cl.
CPC ......... *H01M 4/8621* (2013.01); *H01M 4/861* (2013.01); *H01M 4/8803* (2013.01); *H01M 4/8875* (2013.01); *H01M 4/905* (2013.01); *H01M 4/9066* (2013.01); *H01M 8/12* (2013.01); *H01M 4/8878* (2013.01); *H01M 2008/1293* (2013.01); *H01M 2300/0074* (2013.01)

(58) Field of Classification Search
CPC . H01M 2008/1293; H01M 2300/0074; H01M 4/861; H01M 4/8621; H01M 4/8803; H01M 4/8875; H01M 4/8878; H01M 4/905; H01M 4/9066; H01M 8/12
See application file for complete search history.

(56) References Cited

U.S. PATENT DOCUMENTS

2012/0021333 A1*   1/2012   Hwang ................... C04B 35/47
                                                                    429/486

* cited by examiner

*Primary Examiner* — Carlos Barcena
(74) *Attorney, Agent, or Firm* — WPAT, PC

(57) ABSTRACT

A high permeable porous substrate for a solid oxide fuel cell and a production method to produce the substrate are provided. The high permeable porous substrate for a solid oxide fuel cell includes a porous substrate body and a plurality of channels. The plurality of channels penetrate the first surface of the porous substrate body and does not penetrate the second surface of the porous substrate body. In addition, a production method for the high permeable porous substrate of a solid oxide fuel cell is also provided.

24 Claims, 6 Drawing Sheets

HIGH PERMEABLE POROUS SUBSTRATE FOR A SOLID OXIDE FUEL CELL AND THE PRODUCTION METHOD THEREOF

FIELD OF THE INVENTION

The present invention relates to a porous substrate and the production method thereof, and more particularly, to a high permeable porous substrate for a solid oxide fuel cell and the production method thereof.

BACKGROUND OF THE INVENTION

A solid oxide fuel cell (SOFC) is an electrochemical conversion device that produces electricity directly from oxidizing a fuel. Generally, a ceramic material of yttria stabilized zirconia (YSZ) is commonly used in SOFC as electrolyte to conduct oxygen ions, while a material of Ni-YSZ cermet is used as the anode material and a material of $LaMnO_3$ is used as the cathode material.

Current SOFCs usually are built with comparatively thinner anode layer, cathode layer and electrolyte layer for reducing the polarization losses and ohmic losses in electrodes and electrolyte. Thus, it is generally required to have a support element to be designed in the fuel cell structure. Nowadays, there are many ways to support a SOFC. One common way is simply to use the solid electrolyte as the support element in a SOFC. As the ohmic loss results from the ionic conductivity through the electrolyte, an effective way to decrease ohmic resistance is to decrease the thickness of the electrolyte layer. Thus, a SOFC with a thick electrolyte layer may result in delivering a low output power.

A SOFC can use a porous metal substrate as a support element that is under the anode layer so that the thickness of electrolyte can be reduced to increase its output power. Consequently, the support element consisting of a porous metal substrate is the thickest layer in the SOFC, and is the component that provides the mechanical support. Nevertheless, although a thick layer of support element can provide a good mechanical support, the permeability of such support element can be poor so that not only it may be difficult for hydrogen to enter the anode layer, but also a water byproduct generated from the electrochemical reaction in the anode layer may not drain out of the anode layer easily. Moreover, if the water byproduct does not drain out of the anode layer in time, the path allowing hydrogen to permeate into the anode layer can be blocked to result a great polarization voltage drop on the anode side, this polarization voltage drop is due to the generated concentration gradient of hydrogen in the support element and can further affect the performance of the SOFC.

Therefore, although the permeability of the support element in SOFCs can be improved simply by reducing the thickness of the support element, it is noted that the strength of the support element may be weakened correspondingly, and consequently the long-term operation stability of the cell structure can be adversely affected.

SUMMARY OF THE INVENTION

The present invention is to provide a high permeable porous substrate for a solid oxide fuel cell and the production method thereof. By the high permeability of the porous substrate, hydrogen and the water byproduct can be transmitted smoothly, and thereby, the output power and the fuel utilization efficiency of a SOFC can be enhanced.

In an embodiment, the invention provides a production method of high permeable porous substrates for solid oxide fuel cells, which comprises the steps of: providing a mold, which has a base formed with a plurality of protrusions on a surface of the base; injecting the slurry containing the first powder into the mold; performing a molding/demolding process for producing a green part; sintering the green part in reducing atmosphere at a high temperature so as to form a porous substrate body that has a plurality of channels, the first surface and the second surface in a manner that the first surface is disposed opposite to the second surface; the plural channels are arranged penetrating the first surface but not the second surface, and are formed in shapes corresponding to the shapes of the plural protrusions.

In another embodiment, the invention provides a high permeable porous substrate for a SOFC, the high permeable porous substrate includes a porous substrate body, being made from the slurry containing the first powder, and comprising: the first surface; a second surface, disposed opposite to the first surface; and a plurality of channels, arranged penetrating the first surface but not penetrating the second surface.

Accordingly, by the aforesaid high permeable porous substrate for a solid oxide fuel cell and the production method thereof, hydrogen can be transmitted via the plural channels so that the related mass transfer path to the anode can be reduced, while similarly the water byproduct at the anode can also be transmitted via the plural channels so that the mass transfer path for draining the water byproduct out of the anode can also be reduced. Thus, the output power and the fuel utilization efficiency of a SOFC can be enhanced. Moreover, since the thickness of the porous substrate is not decreased, the porous substrate that is being used as the anode of a SOFC can still provide sufficient supporting strength to the SOFC.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1A:
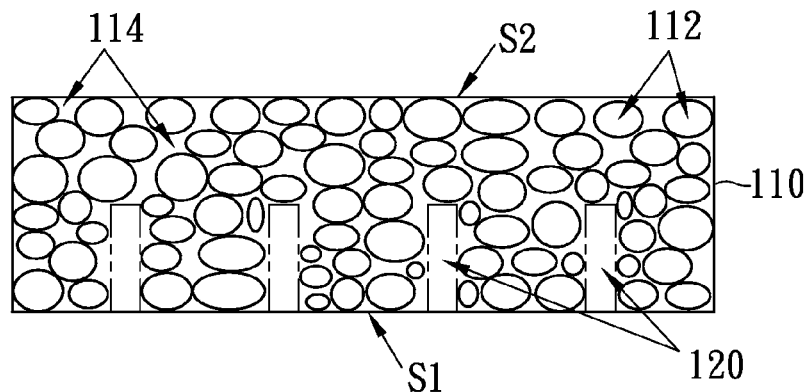
FIG. 1A is a schematic diagram showing a high permeable porous substrate for a solid oxide fuel cell according to an embodiment of the present invention.

Please refer to FIG. 1A, which is a schematic diagram showing a high permeable porous substrate for a solid oxide fuel cell according to an embodiment of the present invention. In FIG. 1, a high permeable porous substrate for a solid oxide fuel cell is disclosed, which comprises: a porous substrate body 110 and a plurality of channels 120.

In this embodiment, the porous substrate body 110 includes a plurality of the first powder particles 112, a plurality of pores 114, the first surface S1 and a second surface S2, whereas the first surface S1 and the second surface S2 are arranged opposite to each other.

In this embodiment, the porous substrate body 110 is substantially a porous substrate made of metals so as to be used as a metal support in a SOFC. Accordingly, each of the plural first powder particles 112 can be a nickel particle or a nickel-based particle made of a nickel-molybdenum alloy, a nickel-iron alloy, a nickel-cobalt alloy, or a nickel-molybdenum-iron-cobalt alloy. Nevertheless, in another embodiment, each of the plural first powder particles 112 can be an iron-based alloy particle, such as ferritic stainless steel. Moreover, in other embodiments, the porous substrate body 110 can be made of an anode cermet material, so that it can be used as a conventional cermet support for a SOFC. In this case, the first powder can be a cermet that is a mixture of oxygen ion conducting particles and electron conducting metal catalytic particles, such as a mixture of YSZ particles and nickel particles.

In this embodiment, each of the plural pores 114 is substantially a space among the first powder particles 112 that are close to one another.

Figure 1B:
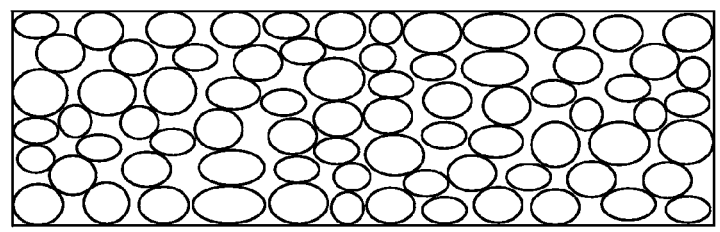
FIG. 1B is a schematic diagram showing a conventional porous substrate.

Please refer to FIG. 1B, which is a schematic diagram showing a conventional porous substrate. As shown in FIG. 1A and FIG. 1B, the high permeable porous substrate 100 of FIG. 1A is different from the conventional porous substrate 10 of FIG. 1B in that: the high permeable porous substrate 100 is formed with a plurality of channels 120 in a manner that the plural channels 120 are arranged penetrating the first surface S1 but not the second surface S2 while allowing none of the first powder 112 to be existed inside the plural channels 120.

It is noted that each of the plural channels 120 can be formed into a cylindrical shape, but is not limited thereby. Thus, in other embodiments, each of the plural channels 120 can be formed into a pentagonal prism shape, a hexagonal prism shape or an octagonal prism shape, which can be selected according to actual requirements. In addition, the average diameter of each of the aforesaid channels 120 ranges from 0.5 mm to 3.0 mm.

As shown in FIG. 1A, after the reactant hydrogen entering the high permeable porous substrate 100 from the first surface S1, it can reach the second surface S2 of the high permeable porous substrate 100 comparatively easier than it can in the conventional porous substrate 10 via the transmission of the plural channels 120. That is, by the transmission of the plural channels 120, the distance of permeation of the reactant hydrogen in the high permeable porous substrate 100 is shortened as the reactant hydrogen had already been guided and transported to positions near to the second surface S2 via the transmission of the plural channels 120, so that it is no longer required to permeate the whole thickness of the high permeable porous substrate 100. Therefore, there will be no restriction to the thickness of the high permeable porous substrate 100 so that it can be formed with a thickness that can provide sufficient support while still maintaining sufficient permeability.

On the other hand, the water byproduct of the anode reaction that is guided to enter the high permeable porous substrate 100 from the second surface S2 can also be drained out of the high permeable porous substrate 100 via the transmission of the plural channels 120, so that the water byproduct will not block the entering of hydrogen. That is, the distance of the reactant hydrogen entering into the high permeable porous substrate 100 is shortened while simultaneously the distance of the water byproduct being drained out of the high permeable porous substrate 100 is also shortened. In addition, as the plural channels 120 can be used for assisting the transmission of both the hydrogen and water byproduct at the same time, the transmission of the hydrogen and water byproduct will not be restricted by the size of the pores 114 formed inside the high permeable porous substrate 100, so that the output power and the fuel utilization efficiency of the SOFC are enhanced.

Figure 1C:
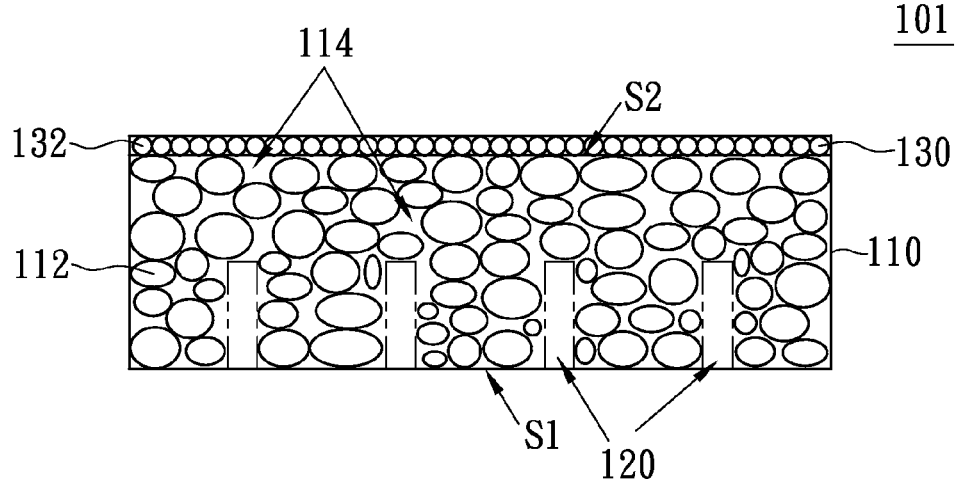
FIG. 1C is a schematic diagram showing a high permeable porous substrate for a solid oxide fuel cell according to another embodiment of the present invention.

Please refer to FIG. 1C, which is a schematic diagram showing a high permeable porous substrate for a solid oxide fuel cell according to another embodiment of the present invention. In the embodiment shown in FIG. 1C, the high permeable porous substrate 101 further comprises a powder layer 130.

In this embodiment, the powder layer 130 is formed on the second surface S2 of the porous substrate 101, and is made by paving the slurry containing a second powder 132. It is noted that the second powder 132 has a particle size smaller than the first powder 112 so as to facilitate the proceeding of the posterior film deposition process. For instance, the second powder 132 has a particle size ranging from 5 μm to 40 μm, and since the pores in the second powder 132 are smaller than 30 μm, a film deposition process can be performed effectively using an atmosphere plasma spraying means, without defecting the resulting film with pores that are too large, and especially a dense and continuous electrolyte layer of a SOFC can be formed and supported by this porous substrate.

Figure 2:
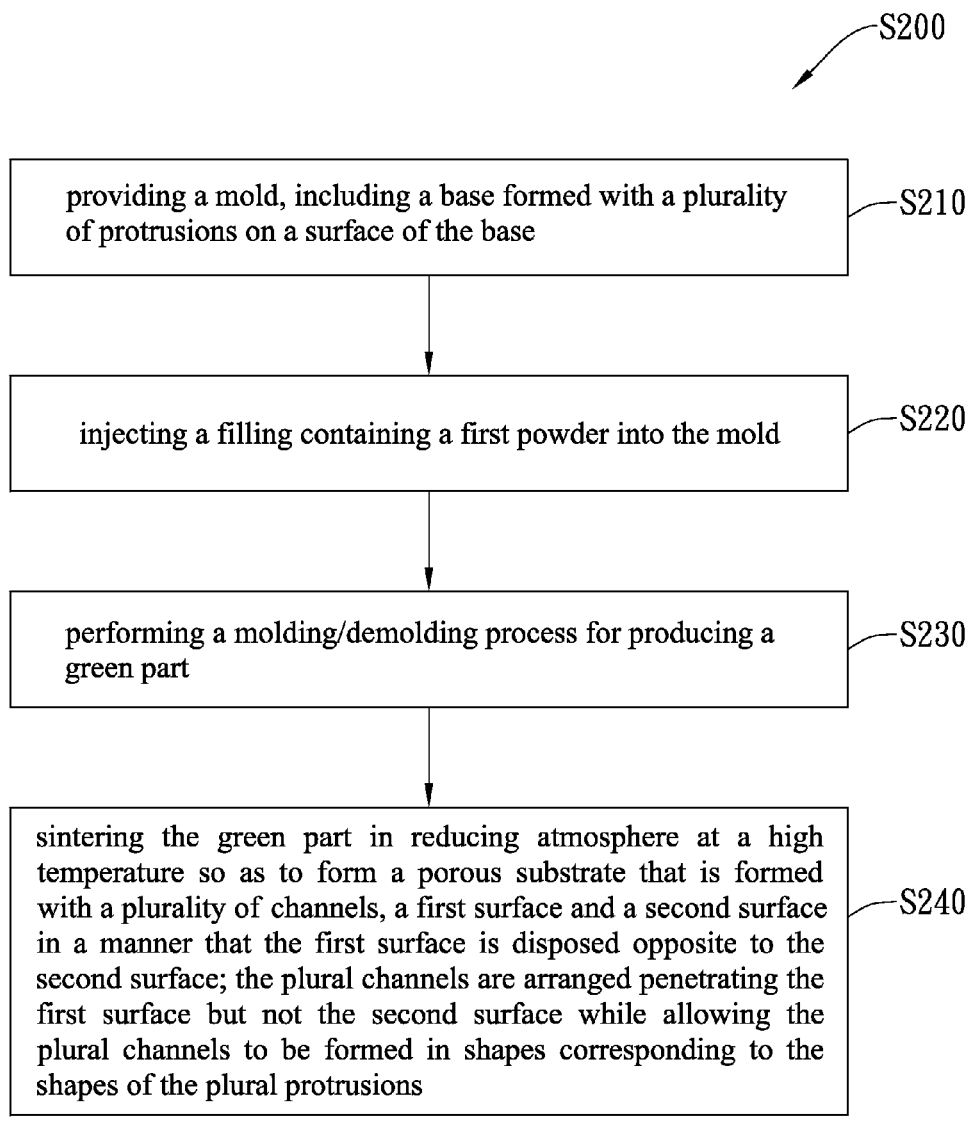
FIG. 2 is a flow chart depicting the steps performed on a production method of high permeable porous substrates for solid oxide fuel cells according to an embodiment of the present invention.
Figure 3:
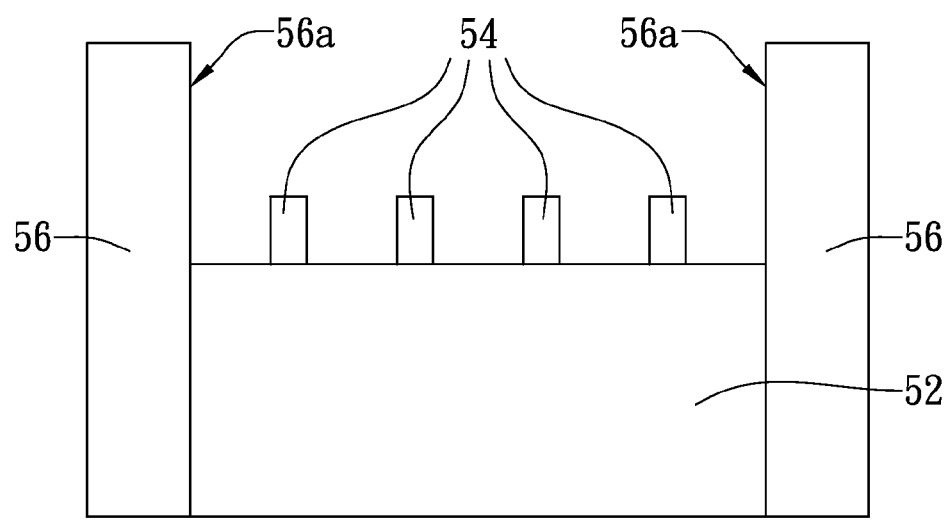
FIG. 3 is a schematic diagram showing a mold used in the production method of FIG. 2.

Please refer to FIG. 2, which is a flow chart depicting the steps performed on a production method of high permeable porous substrates for solid oxide fuel cells according to an embodiment of the present invention. Please refer to FIG. 3, which is a schematic diagram showing a mold used in the production method of FIG. 2. As shown in FIG. 2 and FIG. 3, a production method of high permeable porous substrates for solid oxide fuel cells S200 is disclosed, which comprises the following steps.

The process starts from the step S210. At step S210, a mold 50 is provided, whereas the mold 50 includes a base 52, which is formed with a plurality of protrusions 54 on a surface of the base 52.

It is noted that the base 52 of the mold 50 can be made of a metal or a plastic. In an embodiment, when the base is selected to be made of a plastic, the plastic is polytetrafluoroethylene (PTFE). In another embodiment, when the base is selected to be made of a metal, the metal can be a stainless steel.

Nevertheless, the plural protrusions 54 are formed on the surface of the base 52, no matter the base 52 is made of a metal or a plastic. Moreover, the plural protrusions 54 can be arranged into an array on the surface of the base 52, but it is not limited thereby and can be arranged in any way according to actual requirements.

In addition, the amount of the plural protrusions 54 ranges from 3 pieces per $cm^2$ to 20 pieces per $cm^2$, whereas each of the protrusions 54 is formed like a circular column with a diameter ranging from 0.5 mm to 3 mm and in a height ranging from 0.2 mm to 1.0 mm, the range of this height depends upon the thickness of the high permeable porous substrate 100. For instance, when the high permeable porous substrate 100 is formed in a thickness ranging from 0.4 mm to 0.5 mm, each of the protrusions 54 should be formed in a height ranging from 0.2 mm to 0.3 mm. In the case that the high permeable porous substrate has a thickness ranging from 1 mm to 1.2 mm, each of the protrusions 54 should be formed in a height ranging from 0.5 mm to 0.8 mm.

In FIG. 3, the mold 50 is further formed with a peripheral part 56 at the periphery of the base 52, whereas the peripheral part 56 can be made of a metal. Thus, the mold 50 is substantially the assembly of the base 52 and the peripheral part 56.

In this embodiment, the mold 50 has a recessed (or concave) space that is formed by the enclosure of the surface of the base 52 and the sidewalls 56a of the peripheral part 56. As the protrusions 54 are disposed in the mold 50, the height of the peripheral part 56 is formed in height larger than that of the protrusions 54, the thickness of the high permeable porous substrate 100 can be determined according to the height difference between the peripheral part 56 and the surface of the base 52. In addition, such height difference can range from 0.4 mm to 1.5 mm and depends upon the thickness of the high permeable porous substrate 100 without any further limitation.

After step S210, the step S220 is enabled. At the step S220, the prepared slurry containing a first powder 112 is being injected into the mold 50.

In this embodiment, this prepared slurry is substantially a mixture of the first powder 112, a binder and a solvent, in which the binder can be made of a water-soluble material, such as polyvinyl alcohol (PVA) or methyl cellulose (MC), or an organic-solvent-soluble material, such as polyvinyl butyral (PVB), and the solvent can be water or alcohol.

In this embodiment, the preparing process of the slurry containing the first powder 112 includes the following steps. First, the first powder 112 is provided, which can be made of a material selected from the group consisting of: nickel, nickel-molybdenum alloy, nickel-iron alloy, nickel-cobalt alloy, and nickel-molybdenum-iron-cobalt alloy, the weight percentages of the molybdenum particles in the nickel-molybdenum alloy, the iron particles in the nickel-iron alloy, the cobalt particles in the nickel-cobalt alloy range from 2 wt % to 10 wt %, and molybdenum particles, iron particles and cobalt particles in the nickel-molybdenum-iron-cobalt alloy range from 2 wt % to 10 wt %.

Accordingly, when each of the plural first powder particles 112 is a nickel particle that is a particle with good anti-oxidative property, the size of each nickel particle ranges from 60 μm to 220 μm, whereas the sizes of other metal particles to be mixed with the nickel particles, such as molybdenum particle, iron particle or cobalt particles, range from 0.3 μm to 3 μm, so that the aforesaid mixture of the nickel particles and other metal particles can be stirred and mixed sufficiently by the use of a mixer and an alloy can be produced easily.

In another embodiment, each of the plural first powder particles 112 can be an iron-based alloy particle, such as ferritic stainless steel that has a thermal expansion coefficient matching to that of the electrolyte used in the SOFC for preventing the SOFC from cracking during a heating process. In this embodiment, the weight ratio of the iron particles ranges from 60% to 80%, and is doped with a chromium particles with a weight ratio ranging from 20% to 30%, so that a good antioxidative property can be ensured. It is noted that the ferritic stainless steel can be Crofer22 APU, ZM232 or SUS441, etc.

In another embodiment, each of plural first powder 112 can be made of a cermet, the cermet is a mixture of oxygen ion conducting particles and electron conducting metal catalytic particles, such as YSZ and Ni respectively. The conventional spray dryer can be used to prepare the first powder 112 by spray drying the solution containing a binder, YSZ and Ni particles. In the cermet, the weight ratios of oxygen ion conducting particles and electron conducting metal catalytic particles range from 35% to 65%.

After the providing of the first powder 112, a colloid formation process is enabled so as to obtain a colloid. That is, first, an aqueous solution containing methyl cellulose is prepared, the weight ratio of the methyl cellulose ranges from 5 wt % to 15 wt % in that solution; and then an aqueous solution containing polyvinyl alcohol (PVA) is prepared, the weight ratio of the polyvinyl alcohol ranges from 5 wt % to 15 wt % in the solution. Thereby, by mixing the above aqueous solution containing methyl cellulose at a weight ratio ranging from 10 wt % to 20 wt % and the above aqueous solution containing polyvinyl alcohol at a weight ratio ranging from 80 wt % to 90 wt %, the colloid is obtained.

After the first powder 112 and the colloid are prepared, the first powder 112 and the colloid are mixed so as to form a slurry. In an embodiment, the slurry is formed by the mixing of the first powder with a weight ratio from 85 wt % to 90 wt % and the colloid with a weight ratio from 10 wt % to 15 wt %. Thereafter, the slurry is injected into the mold 50 so as to complete the step S220.

After the step S220, the step S230 is enabled for performing a molding/demolding process so as to produce a green part. In an embodiment, the slurry containing the first powder 112 that is injected into the mold 50 is compressed by the use of a rolling bar until the top of slurry levels to the top of the peripheral part 56, and then a green part can be produced after the slurry is dried in the mold for a specific period of time, e.g. one to two days.

At step S240, a porous substrate body 110 is formed by the sintering of the green part in reducing atmosphere at a high temperature.

In this embodiment, a porous substrate body 110 as the one shown in FIG. 1A is formed, which includes a plurality of channel 120, the first surface S1 and a second surface S2 in a manner that the first surface S1 is disposed opposite to the second surface S2. In addition, the porous substrate 100 is formed with a thickness close to the height difference between the surface of the base 52 and the peripheral part 56 due to a small sintering shrinkage, while the channels 120 are formed in correspondence to the protrusions 54 in shape, height, arrangement and size.

Moreover, the peripheral part 56 is formed with a height higher than that of the protrusions 54, so that the plural channels 120 can be arranged penetrating the first surface S1 but not penetrating the second surface S2.

In this embodiment, the sintering process is enabled at a temperature ranging from 1300° C. to 1500° C. for a time interval from 4 hrs to 8 hrs, while the reducing atmosphere allows the sintering process to be performed in a hydrogen atmosphere environment. For instance, if the hydrogen percentage is 100%, the sintering is considered to be performed in pure hydrogen environment; on the other hand, the sintering can be performed in an environment containing 35% hydrogen and 65% argon. In addition, in the reducing atmosphere, the flow rate of hydrogen can range from 100 cc/min to 500 cc/min, which is determined according to the actual needs.

In the proceeding of the step S210 to S240, by the design of the plural protrusions 54 in the mold 50, the porous substrate 100 is being formed with the plural channels 120, and thereby, the distance of permeation of the reactant hydrogen to the anode of a SOFC in the high permeable porous substrate 100 is shortened. Moreover, as the shape, height, diameter and arrangement of the plural protrusions 54 can be determined and adapted for all kinds of porous substrate 100, the aforesaid process can be used for manufacturing various porous substrates.

Figure 4:
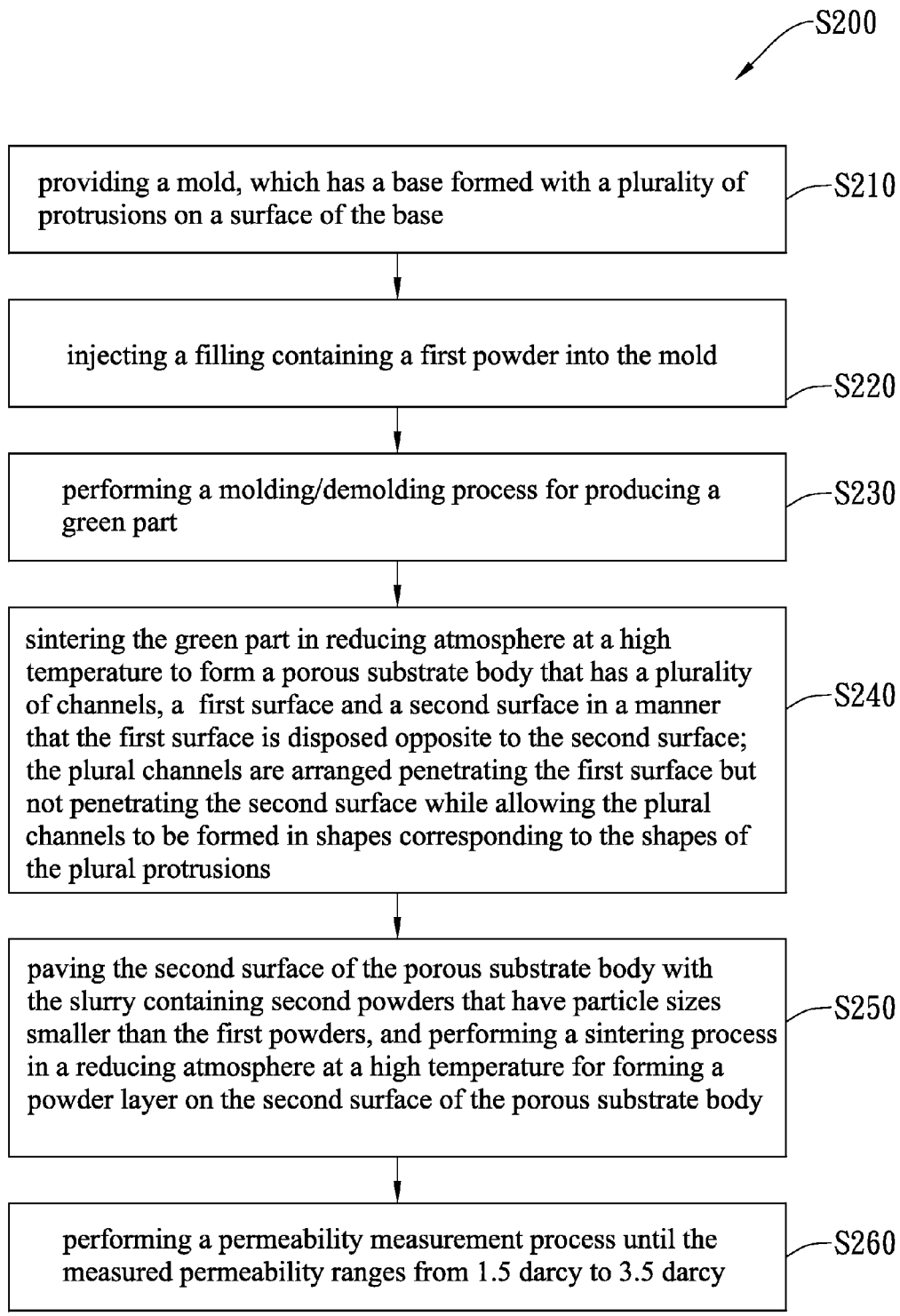
FIG. 4 is a flow chart depicting the steps performed on a production method of high permeable porous substrates for solid oxide fuel cells according to another embodiment of the present invention.

Please refer to FIG. 4, which is a flow chart depicting the steps performed on a production method of high permeable porous substrates for solid oxide fuel cells according to another embodiment of the present invention. As shown in FIG. 4 and FIG. 1C, a production method of high permeable porous substrates for solid oxide fuel cells S200 is disclosed, which includes two additional steps, i.e. step S250 and step S260.

At step S250, a slurry containing a second powder 132 is fed and paved on the second surface S2 of the porous substrate body 110. The same material as the material of first powder 112 is used for the second powder 132, whereas the particle size of the second powder 132 is smaller than that of the first powder 112. For instance, the second powder 132 can be made of a material selected from the group consisting of: a nickel, a nickel-molybdenum alloy, a nickel-iron alloy, a nickel-cobalt alloy, and a nickel-molybdenum-iron-cobalt alloy. Furthermore, in another embodiment, the second powder 132 can be made of an iron-based alloy material or can be made of a cermet that is a mixture of oxygen ion conducting particles and electron conducting metal catalytic particles.

In a condition when the second powder 132 is made of a material selected from the group consisting of: nickel, nickel-molybdenum alloy, nickel-iron alloy, nickel-cobalt alloy, and nickel-molybdenum-iron-cobalt alloy, the weight percentages of the molybdenum particles in the nickel-molybdenum alloy, the iron particles in the nickel-iron alloy and the cobalt particles in the nickel-cobalt alloy range from 2 wt % to 10 wt %, and molybdenum particles, iron particles and cobalt particles in the nickel-molybdenum-iron-cobalt alloy range from 2 wt % to 10 wt %, while the sizes of the molybdenum particles, the iron particles and the cobalt particles range from 0.3 μm to 3 μm.

It is noted that the preparing of the slurry containing the second powder 132 is performed in a way similar to that of the slurry containing the first powder 112, and thus further description is not provided herein. However, the difference between the second powder 132 and the first powder 112 is that: the particle size of the second powder 132 ranges from 5 μm to 40 μm.

Thereafter, a sintering process is performed in reducing atmosphere at a high temperature for forming a sintered powder layer 130 on the second surface S2 of the porous substrate body 110. In this step of performing a sintering process in reducing atmosphere at a high temperature, the high temperature is defined to be from 1150° C. to 1250° C., while allowing the sintering process to last a time interval from 4 hrs to 8 hrs for enabling the surface pores of the powder layer to be formed smaller than 30 μm. Moreover, the porous substrate 100 can be formed in different sizes, such as pieces of 5×5 $cm^2$ or pieces of 10×10 $cm^2$, according to actual requirements.

Thereafter, a step S260 is enabled for performing a permeability measurement process. The desired permeability ranges from 1.5 darcy to 3.5 darcy.

Figure 5:
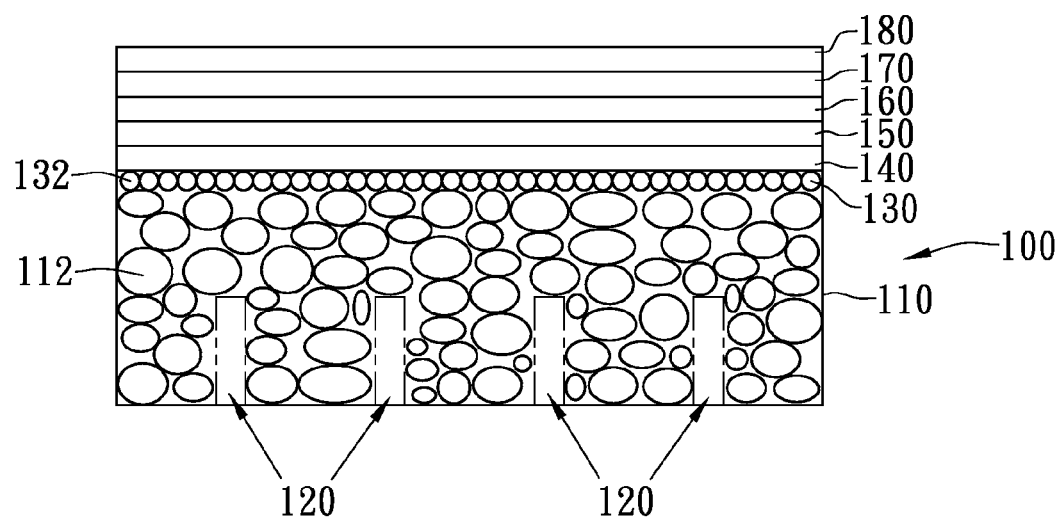
FIG. 5 is a schematic diagram showing a SOFC structure with a high permeable porous substrate of the present invention.

Please refer to FIG. 5, which is a schematic diagram showing a SOFC structure with a high permeable porous substrate of the present invention. After completing the aforesaid steps, a film deposition process can be performed for forming different function layers on the substrate, whereas the film deposition process can be performed in many ways, such as plasma sputtering, plasma spraying, or tape casting, that are not restricted in the present invention. In the embodiment shown in FIG. 5, the film deposition process is performed using an atmosphere plasma spraying method to form a substrate diffusion barrier layer 140, an anode layer 150, an anode diffusion barrier layer 160, an electrolyte layer 170 and a cathode layer 180. It is noted that the structure of SOFC shown in FIG. 5 is only used for exemplary purpose only and is not limited thereby.

Figure 6:
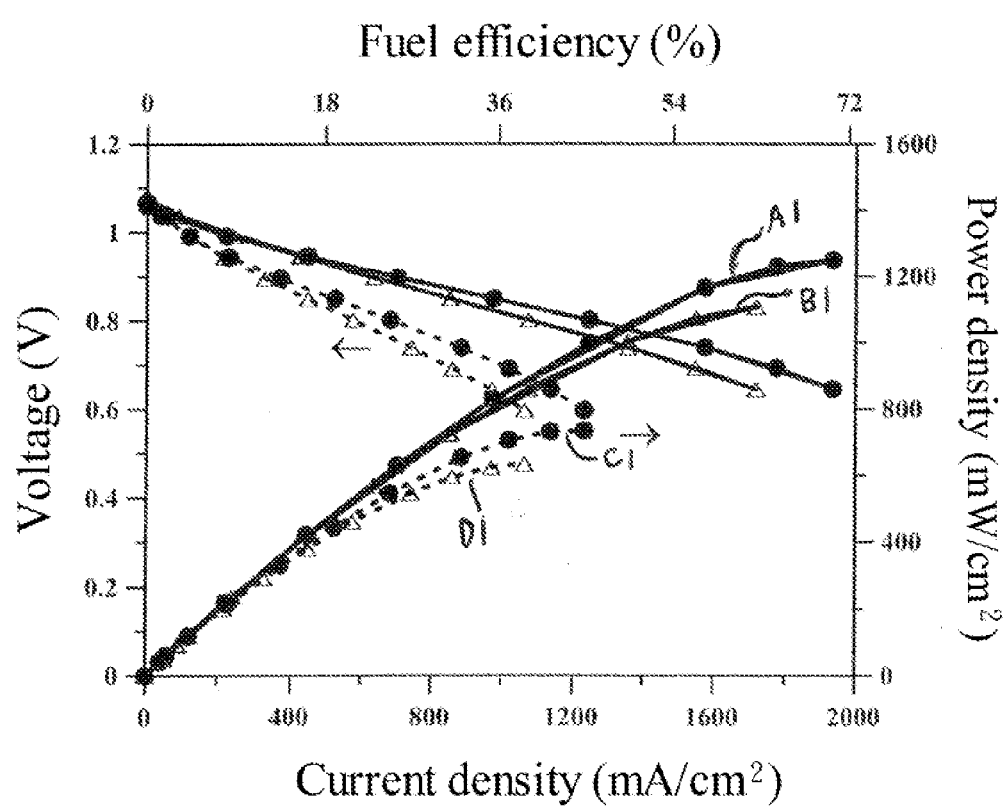
FIG. 6 is a diagram showing the output power and the fuel utilization efficiency achieved in the present invention.

Please refer to FIG. 6, which is a diagram showing the output power and the fuel utilization efficiency of a SOFC achieved in the present invention. In FIG. 6, a SOFC with a porous substrate 100 as the one shown in FIG. 1B is used for comparison and demonstrating the effectiveness of the substrate in the present invention to improve the output power and the fuel utilization efficiency of a SOFC.

In FIG. 6, the curve A1 is achieved by a SOFC supported by the high permeable porous substrate 100 and operated at 750° C., the curve B1 is achieved by a SOFC supported by the high permeable porous substrate 100 and operated at 700° C., the curve C1 is achieved by a SOFC supported by the substrate shown in FIG. 1B and operated at 750° C., and the curve D1 is achieved by a SOFC supported by the substrate shown in FIG. 1B and operated at 700° C. It is noted that all the SOFCs used for achieving the curves A1, B1, C1 and D1 have the same function layers deposited on their substrates, namely, the substrate diffusion barrier 140, anode layer 150, anode diffusion barrier layer 160, electrolyte layer 170 and the cathode layer 180 are the same, but are only different in the porous substrates used for supporting the SOFCs.

From the curve B1, the SOFC operated at 700° C. with the high permeable porous substrate 100 of the present invention can achieve a maximum power density of 1100 mW/$cm^2$ and a fuel utilization efficiency of 63% at this maximum power density. From the curve D1, the SOFC operated at 700° C. and supported by the substrate as shown in FIG. 1B only can achieve a maximum power density of 600 mW/$cm^2$, and a corresponding fuel utilization efficiency of 36%. It is noted by the adoption of the high permeable porous substrate 100 of the present invention, both the maximum power density and the fuel utilization efficiency are improved significantly. Moreover, by comparing curve A1 with curve B1, it is noted that the higher the temperature is, the more significant the improvement in power density and fuel efficiency will be.

To sum up, in the aforesaid high permeable porous substrate for a solid oxide fuel cell and the production method thereof, by including the transmission of the plural channels, the permeation distance of the reactant hydrogen to the anode of a SOFC is shortened, so that it is no longer required to permeate the whole thickness of the high permeable porous substrate used to support the cell. Therefore, a high permeable porous substrate can be formed with a thickness that can provide sufficient support.

Moreover, as the permeation distance of the reactant hydrogen to the anode is shortened, the permeation distance of the water byproduct of anode reaction to drain out of the high permeable porous substrate is also shortened simultaneously. In addition, as the plural channels 120 can be used for assisting the transmission of both the reactant hydrogen and the water byproduct at the same time, the transmission of the hydrogen and the water byproduct will not be restricted significantly by the size of the pores formed inside the high permeable porous substrate, so that the output power and the fuel utilization efficiency of a SOFC are enhanced.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A production method of permeable porous substrates for solid oxide fuel cells, comprising the steps of:
providing a mold, which has a base formed with a plurality of protrusions on a surface of the base;
injecting a slurry containing a first powder into the mold;
performing a molding/demolding process for producing a green part; and
sintering the green part in reducing atmosphere at a temperature to form a porous substrate body that has a plurality of channels, a first surface and a second surface in a manner that the first surface is disposed opposite to the second surface; the plural channels are arranged penetrating the first surface but not penetrating the second surface while allowing the plural channels to be formed in shapes corresponding to the shapes of the plural protrusions.

2. The production method of claim 1, wherein in the step of providing the mold, the mold is formed with a peripheral part at the periphery of the base while allowing the peripheral part to be formed with a height higher than the heights of the plural protrusions.

3. The production method of claim 2, wherein the peripheral part is made of a metal.

4. The production method of claim 1, wherein in the step of providing the mold, the base is made of a material selected from the group consisting of: a metal or a plastic.

5. The production method of claim 4, wherein in a condition when the base is made of a plastic, the plastic is polytetrafluoroethylene (PTFE).

6. The production method of claim 4, wherein in a condition when the base is made of a metal, the metal is a stainless steel.

7. The production method of claim 1, wherein the amount of the plural protrusions ranges from 3 pieces per cm$^2$ to 20 pieces per cm$^2$.

8. The production method of claim 1, wherein each of the plural protrusions in a cylindrical shape is formed with a diameter ranging from 0.5 mm to 3 mm.

9. The production method of claim 1, wherein each of the plural protrusions is formed with a height ranging from 0.2 mm to 1.0 mm.

10. The production method of claim 1, wherein the first powder includes nickel particles that have particle sizes ranging from 60 μm to 220 μm.

11. The production method of claim 1, wherein in the step of injecting the slurry containing the first powder into the mold, the first powder is made of a material selected from the group consisting of: a nickel, a nickel-molybdenum alloy, a nickel-iron alloy, a nickel-cobalt alloy, and a nickel-molybdenum-iron-cobalt alloy.

12. The production method of claim 11, wherein in a condition when the first powder is made of a material selected from the group consisting of: nickel, nickel-molybdenum alloy, nickel-iron alloy, nickel-cobalt alloy, and nickel-molybdenum-iron-cobalt alloy, the weight percentages of molybdenum in the nickel-molybdenum alloy, iron in the nickel-iron alloy, cobalt in the nickel-cobalt alloy range from 2 wt % to 10 wt %, and the weight percentages of molybdenum, iron and cobalt in the nickel-molybdenum-iron-cobalt alloy range from 2 wt % to 10 wt %.

13. The production method of claim 12, wherein the sizes of a molybdenum particle, an iron particle and a cobalt particle of the nickel-molybdenum-iron-cobalt alloy range from 0.3 μm to 3 μm.

14. The production method of claim 1, wherein in the step of sintering the green part in reducing atmosphere at a high temperature, the high temperature is defined to be from 1300° C. to 1500° C., while allowing the sintering step to last a time interval from 4 hrs to 8 hrs.

15. The production method of claim 1, wherein in the case that the first powder is made of an iron-based alloy, the iron-based alloy is ferritic stainless steel.

16. The production method of claim 15, wherein the iron based alloy has a iron weight ratio ranging from 60% to 80% and a chromium weight ratio ranging from 20% to 30%.

17. The production method of claim 1, wherein in the case that the first powder is made of a cermet, the cermet is a mixture of oxygen ion conducting particles and electron conducting metal catalytic particles and the weight ratios of oxygen ion conducting particles and electron conducting metal catalytic particles in the cermet range from 35% to 65%.

18. The production method of claim 1, further comprising the steps of:
paving the second surface of the porous substrate body with the slurry containing a second powder that has a particle size smaller than that of the first powder; and
performing a sintering process in reducing atmosphere at a temperature for forming a powder layer on the second surface of the porous substrate body.

19. The production method of claim 18, wherein in the step of performing a sintering process in reducing atmosphere is performed at a temperature from 1150° C. to 1250° C., while allowing the sintering process to last a time interval from 4 hrs to 8 hrs for enabling the surface pores of the powder layer to be smaller than 30 μm.

20. The production method of claim 18, wherein in the step of paving the second surface of the porous substrate body with the slurry containing the second powder, the second powder is made of a material selected from the group consisting of: a nickel, a nickel-molybdenum alloy, a nickel-iron alloy, a nickel-cobalt alloy, and a nickel-molybdenum-iron-cobalt alloy.

21. The production method of claim 20, wherein in a condition when the second powder is made of a material selected from the group consisting of: nickel, nickel-molybdenum alloy, nickel-iron alloy, nickel-cobalt alloy, and nickel-molybdenum-iron-cobalt alloy, the weight percentages of molybdenum in the nickel-molybdenum alloy, iron in the nickel-iron alloy, cobalt in the nickel-cobalt alloy range from 2 wt % to 10 wt %, and the weight percentages of molybdenum, iron and cobalt in the nickel-molybdenum-iron-cobalt alloy range from 2 wt % to 10 wt %.

22. The production method of claim 21, wherein the sizes of a molybdenum particle, an iron particle and a cobalt particle of the nickel-molybdenum-iron-cobalt alloy range from 0.3 μm to 3 μm.

23. The production method of claim 18, wherein the second powder includes nickel particles that have particle sizes ranging from 5 μm to 40 μm.

24. The production method of claim 18, further comprising the step of:
- after the paving of the second surface of the porous substrate body with the slurry containing the second powder, performing a permeability measurement process and the measured permeability ranges from 1.5 darcy to 3.5 darcy.

\* \* \* \* \*